United States Patent
Meredith et al.

(10) Patent No.: US 9,016,727 B2
(45) Date of Patent: Apr. 28, 2015

(54) APPARATUS FOR REPAIRING TUBULAR MEMBERS

(75) Inventors: Matthew David Meredith, Aberdeen (GB); John Marsden, Aberdeen (GB); Stuart Mitchell, Aberdeen (GB); Nicholas John Ryan, Aberdeen (GB)

(73) Assignee: Flexlife Limited, Aberdeen (GB)

( * ) Notice: Subject to any disclaimer, the term of this patent is extended or adjusted under 35 U.S.C. 154(b) by 237 days.

(21) Appl. No.: 12/934,479

(22) PCT Filed: Mar. 25, 2009

(86) PCT No.: PCT/GB2009/050286
§ 371 (c)(1),
(2), (4) Date: Dec. 8, 2010

(87) PCT Pub. No.: WO2009/118556
PCT Pub. Date: Oct. 1, 2009

(65) Prior Publication Data
US 2011/0089679 A1    Apr. 21, 2011

(30) Foreign Application Priority Data
Mar. 25, 2008  (GB) .................................. 0805342.3

(51) Int. Cl.
F16L 55/175    (2006.01)
F16L 1/26      (2006.01)
F16L 17/10     (2006.01)

(52) U.S. Cl.
CPC ................ *F16L 55/175* (2013.01); *F16L 1/26* (2013.01); *F16L 17/10* (2013.01)

(58) Field of Classification Search
CPC ........... F16L 55/175; F16L 1/26; F16L 17/10; F16L 27/04
USPC .................................. 285/146.1, 146.2, 146.3
See application file for complete search history.

(56) References Cited

U.S. PATENT DOCUMENTS

| 3,606,401 | A  | * | 9/1971  | Schwarz ...................... 285/294.4 |
| 3,954,288 | A  |   | 5/1976  | Smith |
| 3,960,394 | A  | * | 6/1976  | Hubner et al. ............. 285/296.1 |
| 4,647,080 | A  | * | 3/1987  | Sandt et al. ................ 285/296.1 |
| 4,709,729 | A  | * | 12/1987 | Harrison ......................... 138/99 |
| 6,305,719 | B1 |   | 10/2001 | Smith, Jr. et al. |
| 7,207,601 | B2 | * | 4/2007  | Baharav ....................... 285/21.2 |
| 2003/0184086 | A1 | * | 10/2003 | Christianson .............. 285/146.1 |
| 2006/0027627 | A1 |   | 2/2006  | Garrison et al. |

FOREIGN PATENT DOCUMENTS

| CH | 661109  | A5 | * | 6/1987 |
| CH | 675463  | A5 |   | 9/1990 |
| GB | 2210134 | A  |   | 6/1989 |

OTHER PUBLICATIONS

Untermann, Nils, "International Search Report", for PCT/GB2009/050286 as mailed Aug. 4, 2009, 4 pages.

* cited by examiner

*Primary Examiner* — James Hewitt
(74) *Attorney, Agent, or Firm* — Winstead PC

(57) ABSTRACT

An apparatus for repairing a sheath of a pipe includes a sleeve adapted to surround the pipe, at least two circumferential seals between the surface of the pipe and a pressure source for forcing a sealing solution against the surface of the pipe between the two circumferential seals. The apparatus is arranged such that the sleeve is spaced from the outer sheath of the pipe to form a sealed annulus and a sealing solution is introduced into the sealed annulus.

7 Claims, 9 Drawing Sheets

APPARATUS FOR REPAIRING TUBULAR MEMBERS

The present invention relates to a method and apparatus for repairing tubular members and more particularly to a method and apparatus for repairing faults in a flexible pipe. The invention is more specifically related to a method and apparatus for repairing faults in the outer sheath of a flexible pipe, most preferably a flexible pipe of a pipeline.

Pipelines are routinely used for transporting materials such as fluids and particularly hydrocarbons including liquids and gasses over large distances. This may be between an offshore facility such as a well and an offshore processing plant.

The pipeline is generally formed of discrete sections of pipe which are connected together end to end to form a continuous path for the materials to flow. Flexible Pipe is a term used to describe a multi layered pipe which is formed from materials which allow it to bend relatively easily. It is generally constructed of various layers of materials such as polymers and metals or composites.

Flexible pipes are used throughout the oil and gas industry both onshore and predominately offshore. Their attraction is the ease of installation and their ability to withstand cyclic bending, and therefore they are less prone to fatigue than rigid risers.

The internal bore of a flexible pipe can be smooth or rough. A cross-section of a typical flexible pipe 1 is shown in FIG. 1.

The carcass 2 represents the innermost layer of the pipe and prevents the pipe from collapsing under external hydrostatic pressure. The carcass is formed of interlocked wires 3 in the form of a folded interlocked flat metal which provides stability and resists collapse whilst remaining flexible. The carcass also presents a corrugated surface 4 which allows fluids flowing in the pipe to seep through the carcass.

An internal pressure sheath 5 surrounds the carcass and acts as a boundary for conveyed fluids within the pipe. The pressure sheath is generally formed by a thermoplastic inner fluid barrier and provides a seal to prevent internal fluid flowing in the pipeline from escaping from the inner carcass 2.

A pressure armour 6 is formed around the outer surface of the internal pressure sheath and provides hoop strength to the pipeline to resist internal and external hoopwise pressure which could otherwise cause the pipe to collapse.

A helically wound tensile armour 7 formed of rectangular or round wire or composite rods is provided over the pressure armour to provide axial support and to support the hoop strength of the pipeline.

A thermal insulating layer 8 covers the tensile armour to protect the pipe against heat loss from the fluids flowing within the pipe and an outer sheath 9 of thermoplastics surrounds the pipe to protect against seawater ingress and material damage to the surface of the pipe.

For the purposes of the present invention, the outer sheath 9 of the pipe is of most interest.

The outer sheath 9 is generally formed of a polymeric material which is very easy to damage either while the pipe is being handled, laid or through contact in use with subsea objects. Damage to the outer sheath can cause the annulus between the inner carcase 2 and the inner pressure sheath 5 to flood and this can subsequently lead to corrosion fatigue of the pipe.

In order to repair the outer sheath the pipe currently has to be removed from the pipeline, recovered to a surface vessel or shore facility, and a polymer weld performed or a heat shrink tape or clamp applied to the outer surface of the pipe.

Each of these solutions have their own problems which are not easily overcome and subsequently many pipes have either been withdrawn from service or are operating with an extremely high risk of corrosion fatigue occurring. All current repair techniques are only temporary repairs as they cannot be tested or verified to be suitable for the remaining life of the pipe they are fitted to.

Welding is a time consuming operation and is rarely successful if the polymer is wet. This operation requires a skilled operator who may not be available on site, and is the most likely repair to have to take place if the pipe is damaged during installation before entering the water.

Furthermore, such a welding operation requires the use of carefully controlled equipment to perform the weld and this is difficult to achieve on the deck of a vessel or off-shore platform.

The application of heat shrink tape requires a clean and dry surface for the application to be effective. This is not deemed a permanent repair and is not accepted as a suitable repair method on its own but is often used to add confidence to a weld repair. Therefore, the use of a heat shrink tape is likely to raise further issues of cost which are already raised in relation to providing a weld repair discussed above.

Finally, clamps can be an adequate solution providing the pipe does not bend or flex and the clamp is of a suitable size for the diameter of the pipe to be repaired. These conditions are rarely met for repair of flexible pipes as the clamps have to be sized correctly to fit the pipe in question and where repair is taking place on a floating platform or vessel, space is of a premium and it is not possible or cost effective to carry different sized clamps to cover every differently size pipe that may require repair.

If a pipe is not effectively repaired, it is likely to ultimately lead to a catastrophic failure of the pipe.

A preferred solution to the above problems would be to have a clamp which is quick and easy to fit in place no matter what the diameter of the pipe to be repaired. Current claim designs do not allow for the necessary flexure or in many cases the dynamic movement of the pipe as well as pressure and thermal expansion.

It is therefore an aim of the present invention to provide a clamp which can fit a range of diameters of pipe and is quick and easy to fit and suitable for expansion and pipe tolerance ranges the outer diameter of the pipe will possess.

According to one aspect of the present invention there is provided an apparatus for repairing the outer sheath of a pipe, said apparatus comprising a sleeve adapted to surround the pipe, sealing means for establishing at least two circumferential seals between the surface of the pipe and the asleeve and means for forcing a sealing solution against the surface of the pipe between the two circumferential seals, the arrangement being such that in use the sleeve is spaced from the outer sheath of the pipe to form a sealed annulus therebetween.

Preferably the sleeve further comprises a collar to mount the sleeve on a pipe.

Conveniently the sleeve comprises a collar at either end.

Preferably a reservoir is provided in the or each collar.

Thus the fault in the outer sheath of the pipe is encompassed by the sleeve and a first circumferential seal is provided around the pipe by closing the collars around the pipe. The sealing solution provides an additional seal between the circumferential seals and the surface of the pipe which acts to compensate for any irregularities in the surface of the pipe and prevent water ingress into the apparatus and thus into the fault in the outer sheath.

It will be appreciated that the pipe can flex and bend between the collars and therefore the apparatus can be used with either flexible or non flexible pipes.

Preferably the sleeve is flexible.

Advantageously the sleeve comprises a plurality of modules which flex relative to one another.

Preferably a seal is provided between adjacent modules.

Advantageously a reservoir is provided in each collar. Said discrete sealing elements may be stored within the reservoir in the collars.

Preferably the sealing solution comprises a solution of discrete sealing elements.

Preferably the solution is an epoxy or elastomeric solution.

Conveniently the epoxy or elastomeric solution is a gel.

Preferably the means for forcing the discrete sealing elements against the surface of the pipe comprises a pressure source connected to the reservoir within which the sealing elements are stored.

Preferably means are provided for monitoring the pressure in the reservoirs and in the apparatus.

Advantageously, the monitoring means comprises a pressure gauge and/or a pressure sensor.

In the event of any detected pressure loss, the reservoirs may be recharged with sealing solution over the lifetime of the clamp which makes this a permanent repair solution.

According to a further aspect of the present invention there is provided a method of repairing an outer sheath of a pipe, said method comprising the steps of mounting a sleeve over the pipe to provide an annulus therebetween, securing the sleeve in place around the pipe, providing two circumferential seals between the sleeve and the pipe and forcing a sealing solution against the surface of the pipe between the two circumferential seals to form a pressure seal between the circumferential seals and sealing the annulus between the pipe and the sleeve.

Preferably the sealing solution comprises discrete sealing elements and said sealing elements are forced against the surface of the pipe by pressure within a reservoir of the collars.

Advantageously the method further includes the step of monitoring the pressure in the reservoirs and/or in the sleeve to ensure that the pressure seal is maintained.

An embodiment of the present invention will now be described with reference to the accompanying figures in which:—

Figure 1:
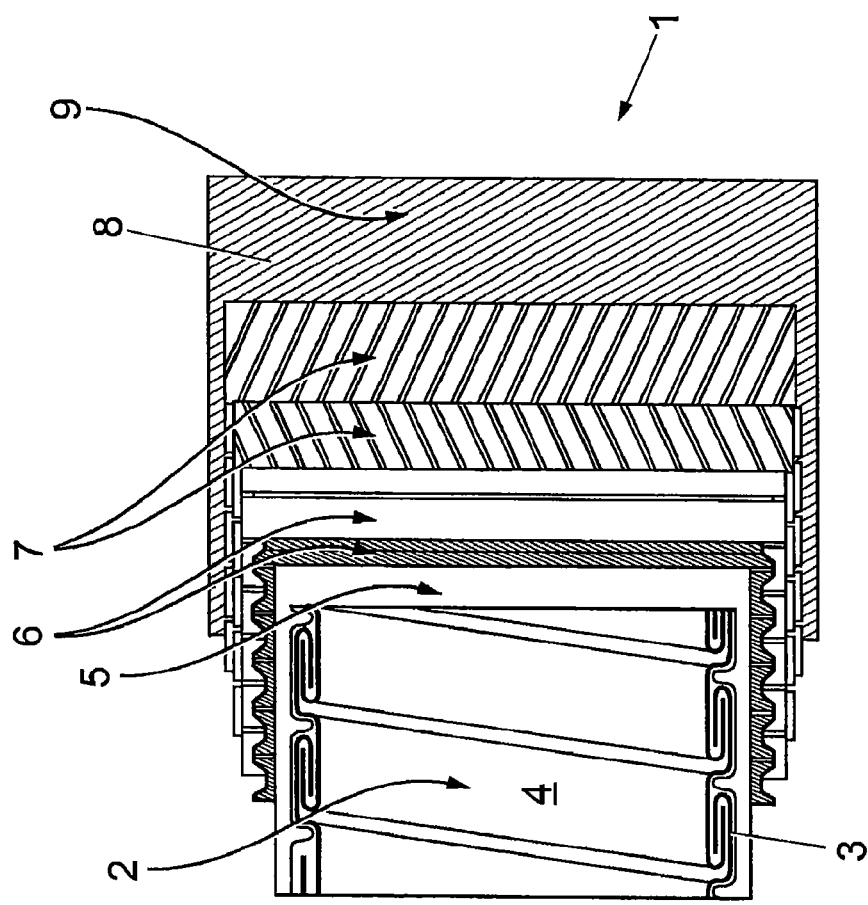
FIG. 1 is a schematic part cross-sectional view of a flexible pipe.
Figure 2:
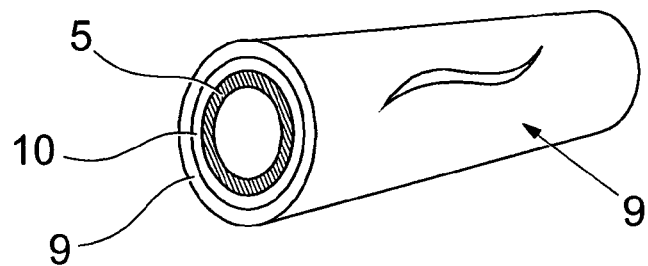
FIG. 2 is a schematic view of the pipe of FIG. 1 with a fault in the outer sheath.

Turning now to the figures, there is shown in FIG. 2 a pipe 1, in this case a flexible pipe which comprises a plurality of layers including a pressure sheath 5, and outer sheath 9 and an annulus 10 therebetween. In this case, a fault in the form of a tear is identified in the outer sheath 9 which exposes the annulus and can lead to water ingress into the annulus thereby over time leading to catastrophic failure of the pipe.

Figure 3:
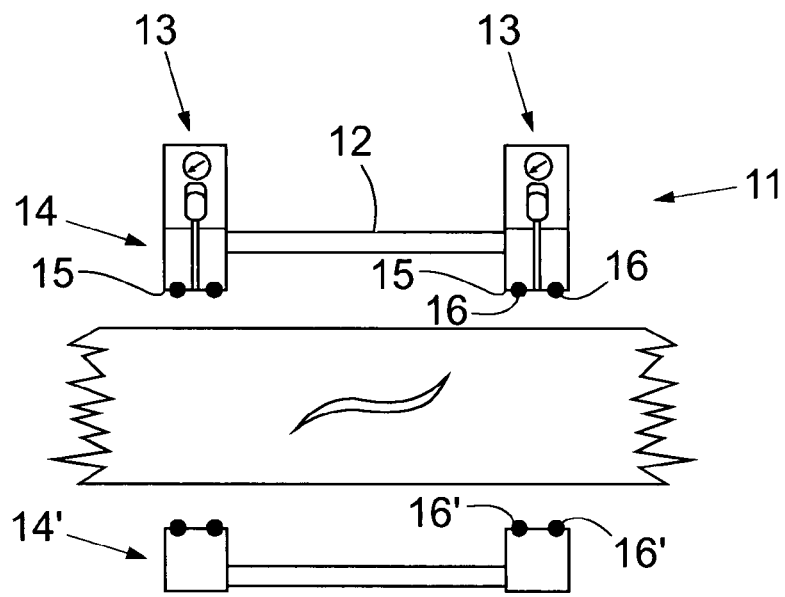
FIG. 3 is a schematic part cross-sectional view through an apparatus according to one aspect of the present invention in an open position applied to the pipe of FIG. 2.
Figure 4:
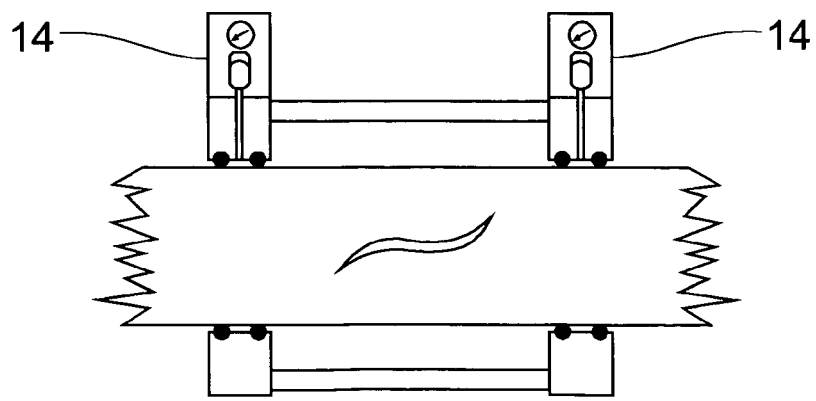
FIG. 4 is a schematic part cross-sectional view through the apparatus of FIG. 3 in a closed position on the pipe of FIG. 2.

An apparatus for repairing the pipe is shown in FIG. 3. The apparatus comprises a clamp 11 which comprises a hollow, tubular sleeve 12 which has an inner diameter which is chosen to enable the clamp to fit over a variety of differently sized pipes.

The sleeve 12 is formed of any suitable material such as a metal or plastics and in some embodiments may be flexible whilst in others it may be rigid depending upon the requirements for the specific pipe.

The clamp comprises a collar 13 mounted at each end of the sleeve. Preferably the collars are annular. The sleeve and collars are preferably formed in two halves and mounted together via suitable hinge and fixing components (not shown) which allow the clamp to be mounted over a section of a pipe.

Figure 5:
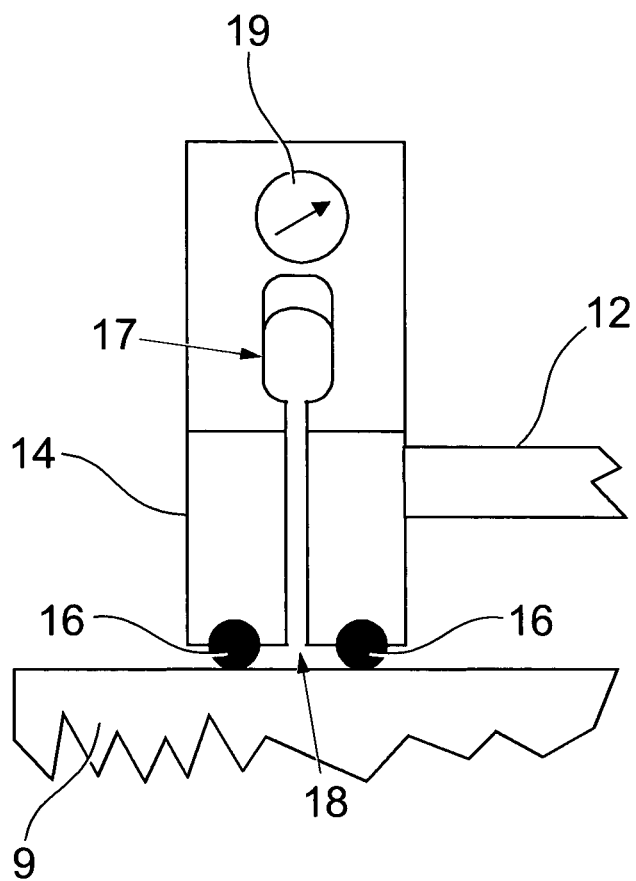
FIG. 5 is an enlarged schematic view of one collar of the apparatus of FIG. 3.
Figure 6:
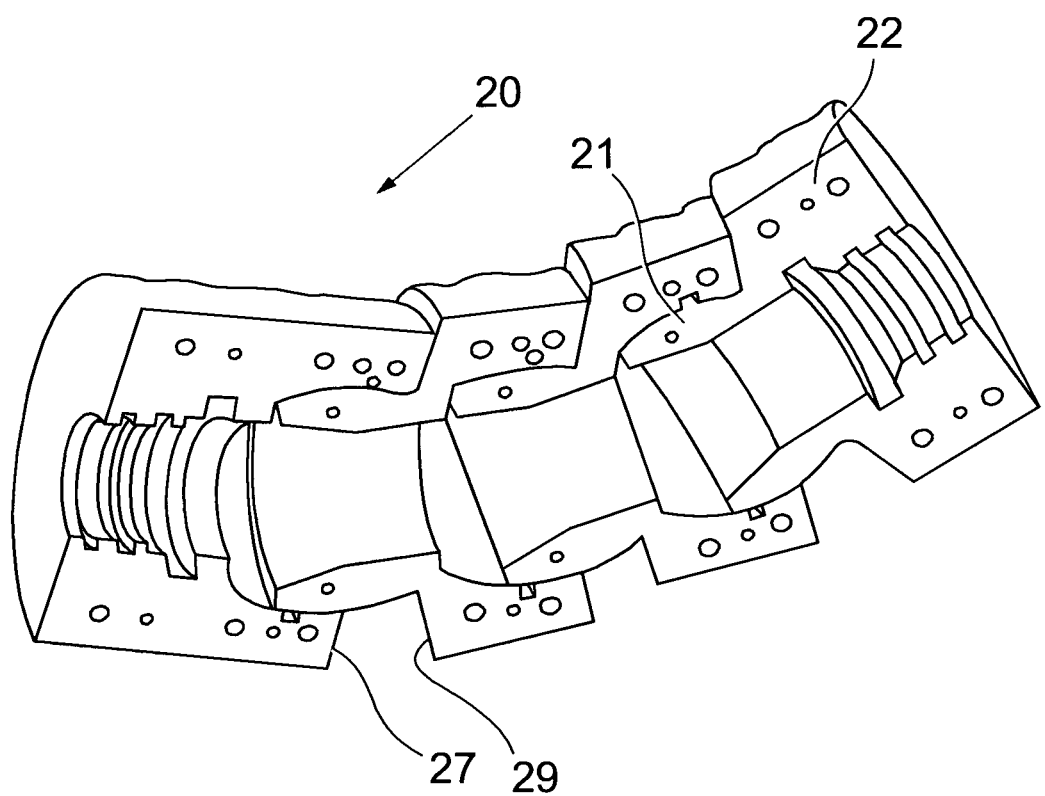
FIG. 6 is a schematic part cross-sectional view of an apparatus according to a further embodiment of the present invention.
Figure 7:
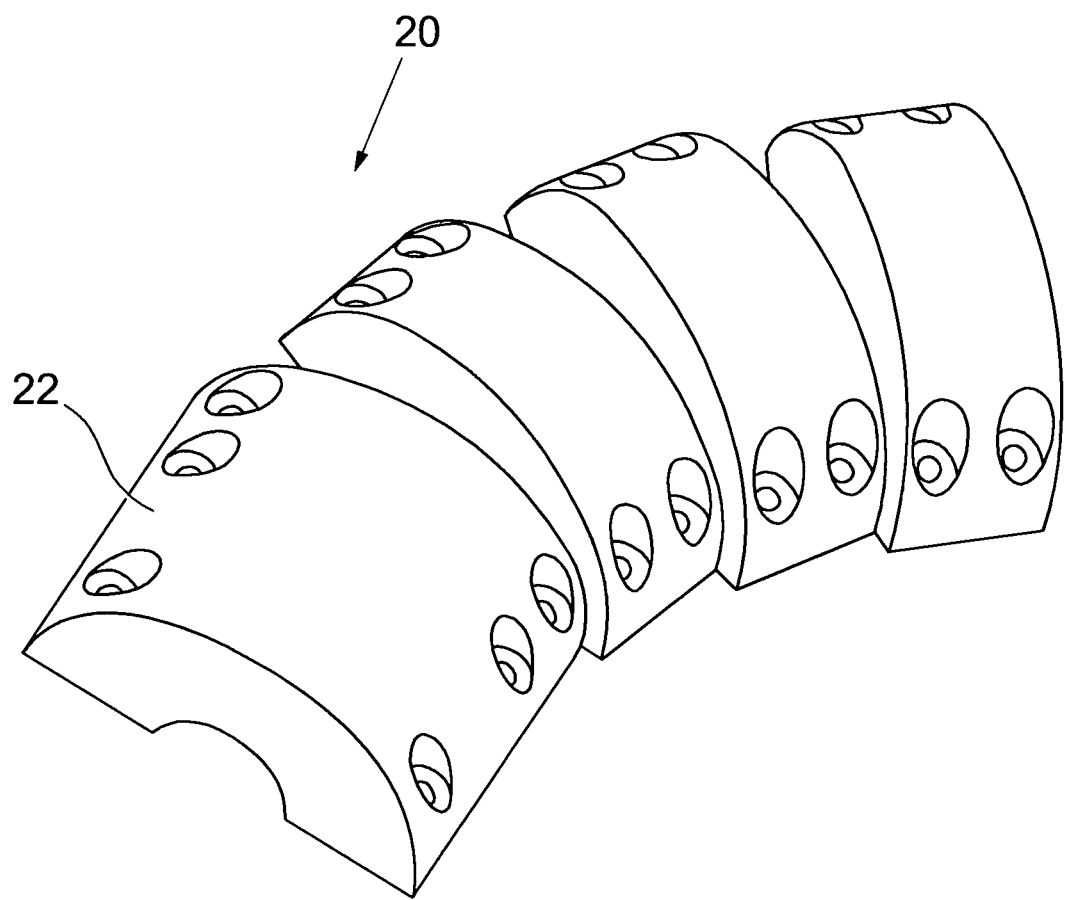
FIG. 7 is a schematic perspective view of part the outer surface of the apparatus of FIG. 6.
Figure 8:
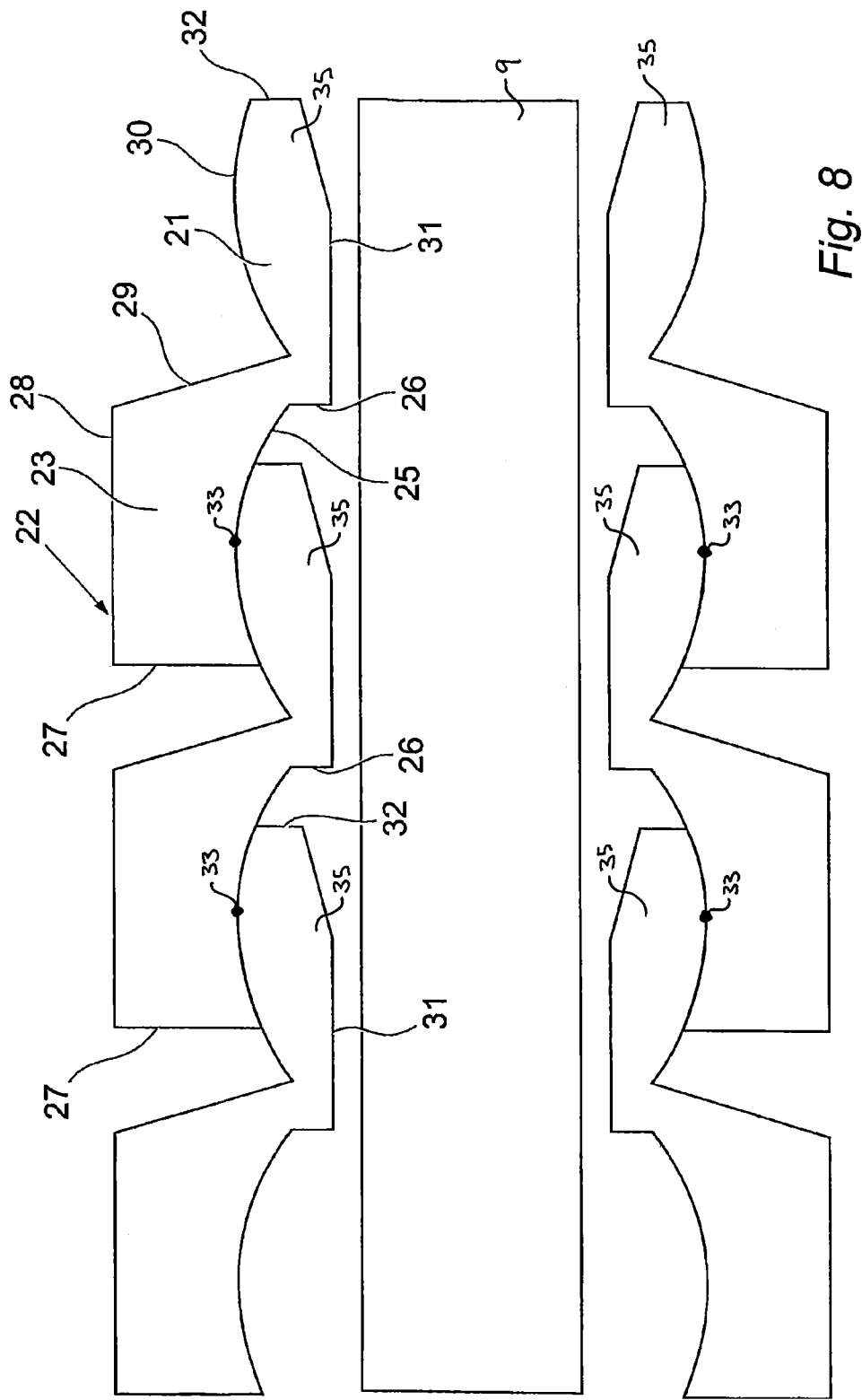
FIG. 8 is a schematic cross-sectional view of the apparatus of FIG. 6 surrounding a tubular member.
Figure 9:
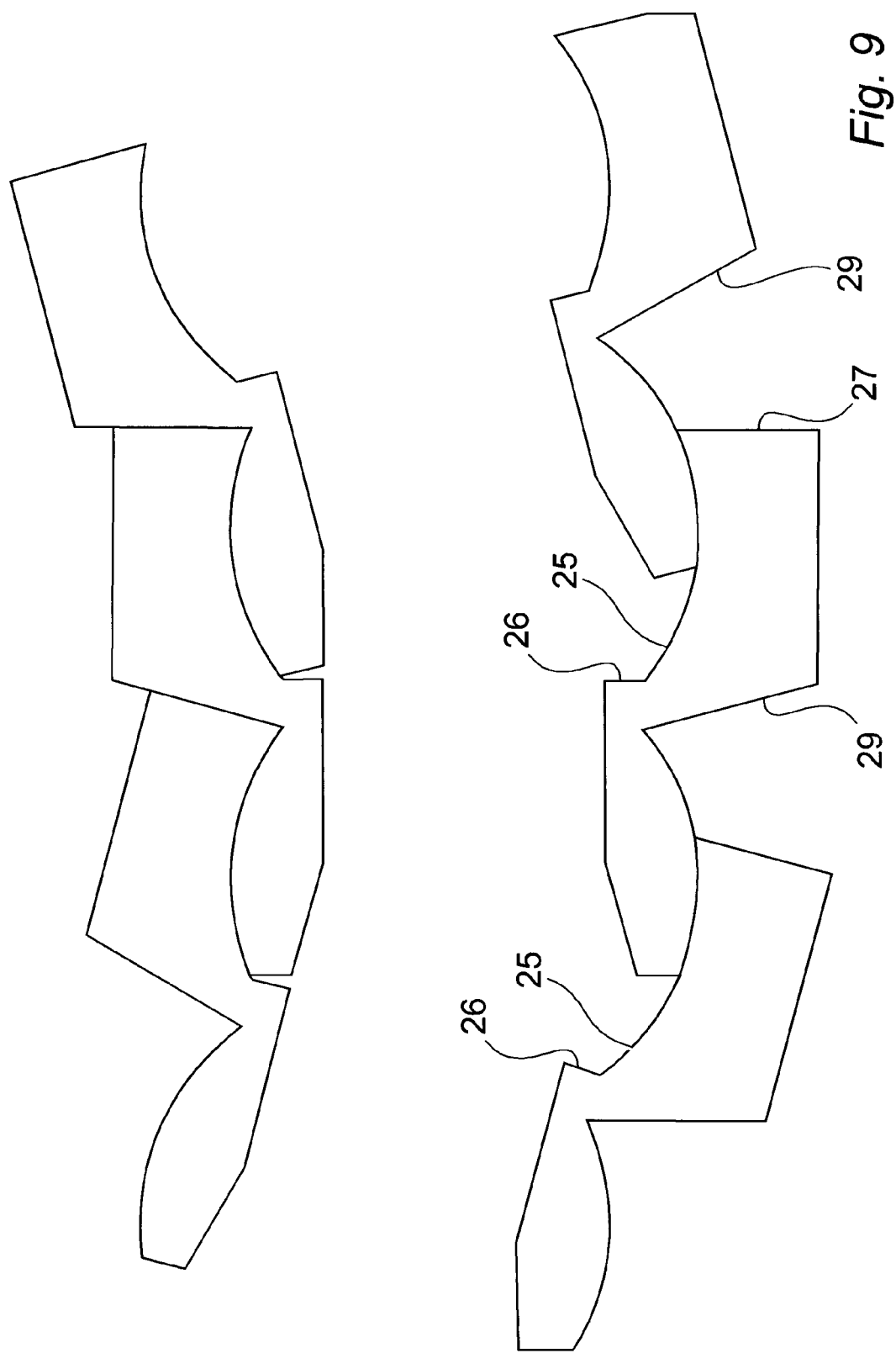
FIG. 9 is a schematic view of the apparatus of FIG. 8 in a curved orientation.

The upper section 14 of one of the annular collars is shown in more detail in FIG. 5. The inner surface 15 of the upper section of the collar comprises a pair of seals 16 which may for example be gaskets or o-rings mounted within grooves (not shown) in the inner surface 15 of the upper section of the collar. In another embodiment, the seals may be provided directly on the inner surface of the upper section of the collar.

Corresponding seals 16' are provided on the inner surface 15' of the lower section of the collar such that when the collar is closed around a pipe the sealing means 16, 16' are compressed against the surface of the pipe to form an annular seal around the outer surface of the pipe.

The upper section 14 of the collar has an internal reservoir 17 which can be charged with a sealing solution and preferably a solution of discrete sealing elements as described further below. The outlet 18 of the reservoir is located between the two seals 16 on the inner surface 15 of the collar.

A port (not shown) may be provided in the side of the upper section of the collar to charge the reservoir with the solution of discrete particles when the clamp is mounted on a pipe.

A pressure gauge 19 is mounted within the upper section 14 of the annular collar and serves to monitor the pressure within the reservoir 17 of the clamp. The pressure gauge may also be adapted to monitor pressure within the sleeve when the sleeve is applied over a pipe.

The use of the repair apparatus will now be described.

When a fault is located in the outer sheath 9 of a pipe, a clamp is selected to mount over the fault. The clamp is selected depending upon the outer diameter of the pipe to be repaired but it is envisaged that a clamp will fit a range of pipe diameters.

The reservoir 17 within each collar is charged with a sealing element solution under pressure. Charging of the reservoirs may be effected during preparation of the clamp before travelling to an off-shore site for repair or may alternatively be effected on site for example on a surface vessel or floating platform prior to deployment of the clamp.

The sealing elements may comprise elastomeric or polymeric materials. In a preferred embodiment the sealing elements may be suspended in a gel solution. The gel solution may comprise an epoxy or elastomeric solution.

The clamp is mounted over the fault in the outer sheath 9 of the pipe ensuring that the sleeve 12 of the clamp extends over the fault and the collars 13 of the clamp are positioned on either side of the fault.

In use, the sleeve is spaced from the outer surface of the pipe to form an annulus between the pipe and the sleeve. The annulus is sealed to prevent any water ingress through the apparatus.

The camp is closed over the pipe and the seals 16, 16' on the inner surface 15, 15' of the collars at either end of the pipe form a circumferential seal around the pipe on either side of the fault. The clamp is retained in the closed position by suitable fixing means (not shown) securing the upper and lower sections of the clamp together.

Once the collars are in position, the pressure within the reservoirs is increased and the sealing elements in solution within the reservoirs 17 in either collar are forced from the reservoirs into the space between the two circumferential seals at the inner surface of each collar and held against the surface of the pipe and the circumferential seals by the high pressure within the reservoir. The sealing elements are forced out of the outlet 18 of the reservoirs and flow along the surface of the pipe between the two seals to form a circumferential pressure seal which prevents the ingress of any water into the clamp.

A positive pressure reading at the pressure gauge(s) 19 on the clamp indicates that the seals are activated and the fault in the outer sheath 9 of the pipe has been isolated.

In the event of a loss of pressure in one of the reservoirs 17 or in the sleeve, the reservoir may be recharged from an external source thereby increasing the lifetime of the repair. Such a loss of pressure will indicate a failure of one of the circumferential seals 16, 16' on the inner surface 15, 15' of the collar and allow remedial action to be taken at an early stage.

In order to remove a sealing clamp from a pipe, the pressure within the reservoir 17 can be reduced or removed thereby breaking the pressure seal between the solution of sealing elements and the surface of the pipe between the two circumferential seals 16, 16'. The fixing means can then be removed and the clamp can be hinged open to lift the clamp clear of the outer surface of the pipe.

The embodiment above describes the use of a sealing solution preferably formed of a solution of discrete sealing elements. In some embodiments of the present invention the pressure seal between the frame and the pipe may comprise a setting gel or bonding material such as an epoxy or elastomer material. In one embodiment a catalyst may be provided to set the gel around the sealing elements. In some embodiments a setting gel or bonding material may be provided between the resilient seals in advance of a solution of discrete sealing elements. In other embodiments further setting gel or bonding material may be forced between the resilient seals after an initial charge of setting gel or bonding material is used without providing discrete sealing elements.

A further embodiment of the present invention is shown in FIGS. 6-11. In this embodiment the sleeve 20 is formed of a plurality of interconnecting modules. Each module comprises a male component 21 and a female component 22. In the embodiment shown the male and female component are integrally formed but in some embodiments it is envisaged that they may be separately formed and connected together.

The female component comprises a substantially annular body 23 which has a concave inner surface 25 which terminates at an internal annular flange 26.

The leading edge 27 of the body is provided substantially perpendicularly to the outer surface of the body 28. The following edge 29 of the body tapers outwards from the outer surface to the inner surface.

The male component 21 is provided at the junction between the following edge 29 and the inner surface 24 of the female component 22 adjacent the annular flange 26.

The male component has a convex outer surface 30 which has substantially the same radius of curvature as the inner surface of the female component. The inner surface 31 of the male component extends substantially axially between the flange 26 of the female component to a point about midway along the male component from where it tapers outwards to terminate at a substantially perpendicular shoulder 32. The height of the shoulder 32 is substantially similar to the height of the internal annular flange 26 of the female component.

In use, the male component 21 is mounted within the body of the female component 22 of the adjoining module in a ball and socket fit which allows one module to flex in relation to the adjoining module.

As the modules flex, the outer convex surface 30 of the male component slides along the inner concave surface 25 of the female component on one side of the modules such that the distance between the leading edge of a first module and the following edge of a second module increases. At the other side of the modules, the distance between the shoulder of the male component and the internal annular flange of the female component of the adjoining module decreases.

Seal means 33 such as o-rings or gaskets may be provided between the outer convex surface of the male component and the inner concave surface of the female component of the adjoining module.

As a sleeve can be formed of a plurality of modules, each of which can flex with respect to the adjoining module, the sleeve can bend and flex around a large variety of curved structures.

Figure 11:
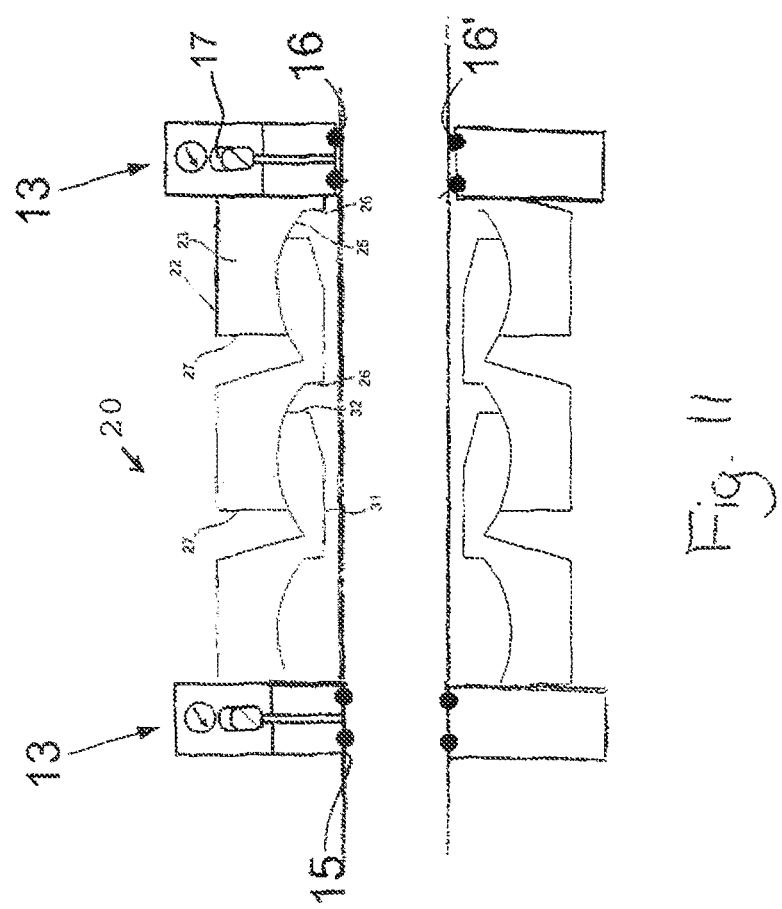
FIG. 11 is a schematic cross-sectional view of the apparatus of FIG. 6 illustrating arrangement of a collar, a seal, and a reservoir.

As shown in FIG. 11, a collar 13, having a plurality of seals 16 arranged on an inner surface 15 thereof, as described above is provided within the outermost modules of the sleeve 20 to seal the sleeve to the pipe or riser and also to provide the reservoirs 17 to establish the pressure seals.

Figure 10:
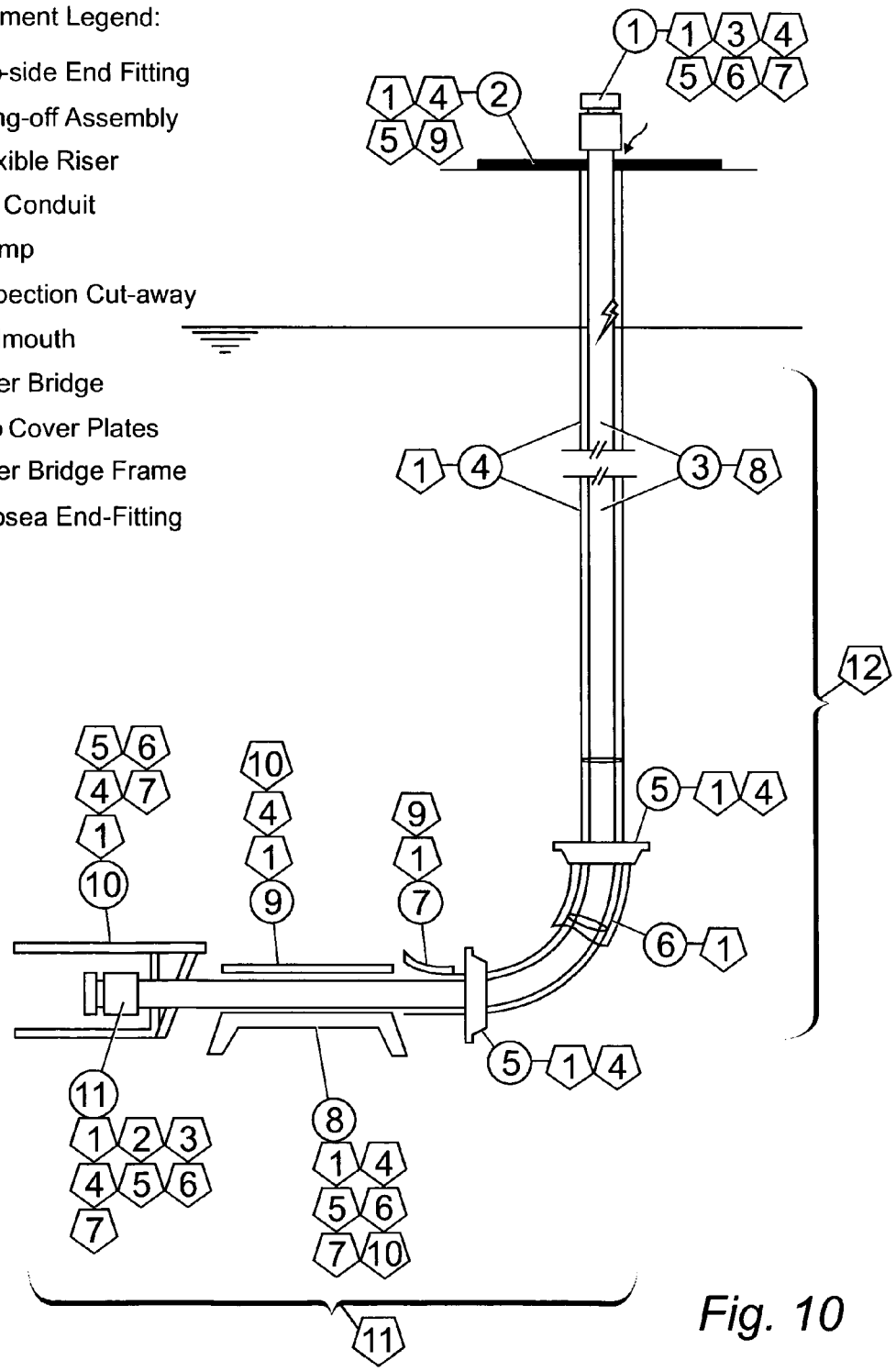
FIG. 10 is a schematic view of the apparatus of FIGS. 6-8 in use around a flexible riser.

FIG. 10 shows a curved sleeve comprising a plurality of modules as described above used to provide a seal around a pipe which extends between an end fitting and a subsea end fitting. In the illustrated embodiment, the subsea end fitting is located within a riser bridge frame. This illustrates an embodiment of the invention where a pressure seal is established between an I-tube and a pipe which allows water in the I-tube to be evacuated. A similar system can be used to provide a pressure seal between a pipe and any other interface.

The same system can be used on static or dynamic applications and addresses the problem that the outer sheath of a pipe cannot be inspected when it is inside a metal tube and thus any defects or holes cannot be detected. As the metal tube can be evacuated, the problems associated with corrosion do not occur and therefore any defect or hole in the pipe will not lead to failure as would normally occur. Therefore the present invention provides a means of protecting the pipe.

Another embodiment is the use of a pressure seal as described above for thermal covers which usually don't or can't seal and thus make the calcs difficult overly conservative etc. Sealing prevents the convection of the fluid and makes the integrity of the thermal seal sound.

It is envisaged that once a clamp is removed from a pipe, the reservoir 17 can be recharged and the clamp reused in further maintenance or repair operations. This provides further cost savings in relation to recovery and reuse of the components of the clamp.

It will be appreciated that in addition to the sealing solution being applied from the reservoirs in the collars between the seals 16, a further sealing solution may also be introduced into the annulus between the outer surface of the pipe and the sleeve.

The present invention allows for the flexure and diametric tolerances of the pipe. It requires no hot permit to fit which is a critical factor in the repair of pipe offshore. The seals can be monitored visually or remotely to ensure the positive pressure within the reservoir is maintained.

It is envisaged that a monitoring system may be provided to alert an operator either on an offshore facility or on onshore plant to any problems in the integrity of the seal. This would allow for routine maintenance to be more effectively targeted and carried out and also identify quickly any recurring problems in the pipeline.

The clamp of the present invention can be fitted either in air offshore, or onshore, or alternatively subsea without disturbing the pipe. This allows for immediate repair or the outer sheath of a pipe should it be damaged during the laying process from a barge or floating platform or vessel. This represents a further significant cost and time saving as the laying operation would not need to be significantly delayed pending repair of a pipe as the clamp can be quickly fitted on site to allow the operation to continue.

The invention claimed is:

1. A pipe sheath repair apparatus comprising:
   a sleeve adapted to surround a pipe;
   a first collar disposed at a first end of the sleeve;
   a second collar disposed at a second end of the sleeve;
   a first reservoir disposed in the first collar and a second reservoir disposed in the second collar;
   a first sealing arrangement disposed between a surface of the pipe and the first collar and a second sealing arrangement disposed between the surface of the pipe and the second collar;
   a first sealing solution disposed in the first reservoir and the second reservoir, the sealing solution being forced, via pressure in the first reservoir and the second reservoir, against the surface of the pipe between the first and second sealing arrangements, respectively, when the apparatus is installed; and
   wherein the sleeve comprises a plurality of modules that flex relative to one another the plurality of modules being arranged such that the sleeve is spaced from an outer sheath of the pipe to form a sealed annulus and a second sealing solution is introduced into the sealed annulus.

2. An apparatus according to claim 1, wherein at least one of the first sealing solution and the second sealing solution comprises a solution of discrete sealing elements.

3. An apparatus according to claim 2, wherein the solution is an epoxy or elastomeric solution.

4. An apparatus according to claim 3, wherein the epoxy or elastomeric solution is a gel.

5. An apparatus according to claim 2, comprising a pressure source connected to at least one of the first reservoir and the second reservoir for forcing the discrete sealing elements against the surface of the pipe.

6. An apparatus according to claim 1, wherein at least one of a pressure gauge and a pressure sensor is provided for monitoring the pressure in at least one of the first reservoir and the second reservoir and in the apparatus.

7. An apparatus according to claim 1, wherein a seal is provided between adjacent modules.

* * * * *